March 11, 1969  L. V. HALL  3,432,078
DIMINISHING CONTAINER AND DISPENSER
Filed April 26, 1966
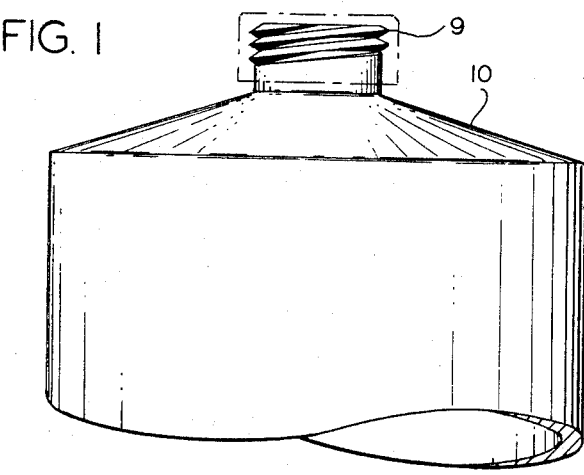
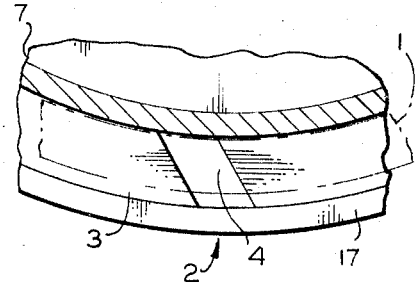
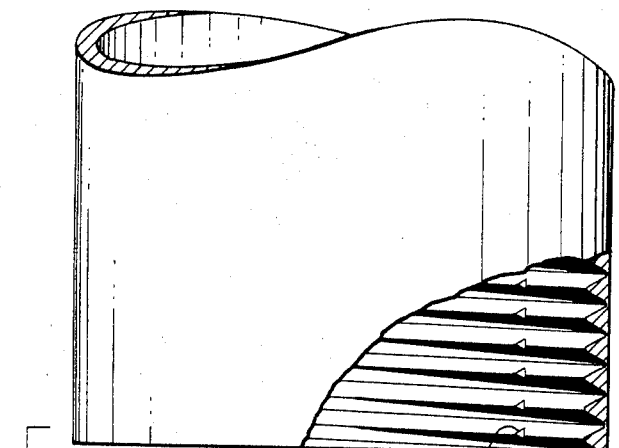
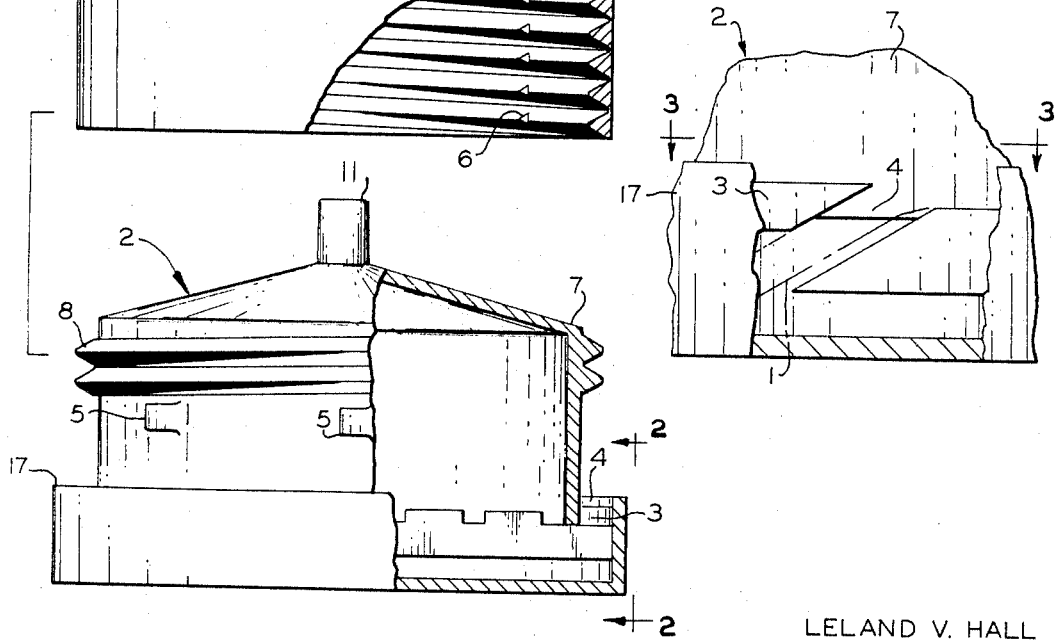
LELAND V. HALL
INVENTOR
BY
BUCKHORN, BLORE, KLARQUIST & SPARKMAN
ATTORNEYS United States Patent Office 3,432,078
Patented Mar. 11, 1969

3,432,078
DIMINISHING CONTAINER AND DISPENSER
Leland V. Hall, P.O. Box 174,
Riddle, Oreg. 97469
Filed Apr. 26, 1966, Ser. No. 546,140
U.S. Cl. 222—80          5 Claims
Int. Cl. B65d *83/00;* B67b *7/30;* B67d *5/42*

ABSTRACT OF THE DISCLOSURE

A short piston threaded at its upper end is screwed into a squeeze bottle and carries a cutter which shaves off the end of the squeeze bottle. The piston is hollow and receives the shavings as they are formed. Pawls on the piston engage teeth in the threads of the squeeze bottle to prevent the piston from being unscrewed out of the squeeze bottle. The top end of the piston is complementary in shape to the top of the squeeze bottle, and a projection on the end of the piston extends out of the spout of the squeeze bottle when the bottle is empty.

---

This invention relates to a diminishing container and dispenser, and more particularly to a container which is shaved as material is dispensed therefrom.

An object of the invention is to provide a new and improved diminishing container and dispenser.

Another object of the invention is to provide a structure which shaves a tubular container and collects the shavings.

A further object of the invention is to provide a piston adapted to be screwed into a tubular container and having ratchet pawl means preventing reverse rotation of the piston.

Another object of the invention is to provide a flexible squeeze bottle type container together with a hollow piston adapted to be screwed into the container, shave off the lower end of the container, catch and contain the shavings, fit closely against the end of the container to completely empty the container and project a pin out the container spout to visually indicate emptiness of the container.

The invention provides a container structure including a hollow piston screwed into a tubular container and carrying a cutter which haves the container. The hollow piston receives and contains the shavings. Preferably the container has notches therein and the piston has one-way pawls which enter the notches to prevent unscrewing of the piston. The piston preferably has a forward end complementary in shape to the end wall of the container and also preferably carries a pin adapted to project out through the spout of the container when the container is empty. The container preferably is flexible to permit use as a squeeze bottle. Preferably only the forward end of the piston is threaded to facilitate molding the piston.

In the drawings:

FIG. 1 is a fragmentary, partially sectional, exploded view of a container structure forming one embodiment of the invention;

FIG. 2 is an enlarged, fragmentary vertical section of the container structure of FIG. 1; and FIG. 3 is a horizontal section taken along line 3—3 of FIG. 2.

The inside of the vertical wall of cylinder 1 (FIG. 1) is threaded entirely from top to bottom. The outside of the vertical wall of a hollow piston 2 is threaded at its upper end. A top portion 7 of piston 2 serves as the bottom and seal for the cylinder 1 as they are screwed together Below a threaded portion 8 of piston 2 there is a cutter 3 (FIG. 1) either molded into as a portion of piston 2, or a separate part to be inserted. As the bottom of cylinder 1 reaches the bottom of slot 4, the cylinder comes in contact with a cutter 3. The cutter 3 is positioned so as to cut the cylinder wall between adjacent turns of the thread so as to cut a minimum wall thickness. As the piston 2 is further turned, cutter 3 shaves the bottom of cylinder 1, and the shavings travel into the hollow interior of the piston through an opening in the bottom of slot 4. The bottom of the slot 4 has a series of such openings to prevent shavings from clogging in case of reverse rotation of piston 2. As piston 2 is rotated, the contents of cylinder 1 are forced out a spout 9 of said cylinder, and, at the same time, the bottom of the cylinder is being shaved off and deposited inside the piston. Top 7 of the piston fits the contour of the inside of top 10 of cylinder 1 so as to dispense the entire contents, and a pin 11 gives a visual indication when the container is empty, as the pin 11 comes to the surface of the opening of the spout. A rim 17 of a cap-like lower portion confines the lower end of the cylinder 1.

As a means of preventing reverse rotation of the piston 2, there is a series of buttress type protrusions or pawls 5 on the side wall of the piston 2 or a click type pawl may be inserted as part of cutter 3 as illustrated in FIG. 2. These clicks or protrusions are to be accommodated by a series of shallow, buttress or one-way type vertical splines or notches 6 on the inner wall of the cylinder as illustrated.

In the above-described container structure, the hollow piston collects and holds the shavings as they are formed. The pawls 5 and notches 6 prevent accidentally unscrewing the piston, and the projection 11 provides a visual indication of emptiness. The flexible cylinder 1 serves as a squeeze type dispenser if desired, as well as dispensing whent he piston is screwed into the cylinder. The thread 8 is only on the upper portion of the piston 2 to facilitate molding the piston.

It is to be undestood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In a dispensing container structure, a threaded cylinder having a discharge opening,
   a piston adapted to be screwed into the cylinder to force contents through the opening,
   a cutter carried by the piston for shaving the cylinder as the piston is screwed into the cylinder,
   and chamber means carried by the piston for receiving and retaining shavings formed by the cutter.

2. The dispensing container structure of claim 1 wherein the piston is hollow to define the chamber means and includes a passage from the cutter to the interior thereof.

3. The dispensing container structure of claim 1 wherein the piston includes a projection adapted to project through the discharge opening when the cylinder is empty.

4. In a dispensing container structure,
   a cylinder having an internal thread,
   a piston including a hollow forward portion having an external thread at its forward end portion and adapted to be screwed into the cylinder,
   the piston also including a rear cap portion closing the rear end of the forward portion and projecting beyond the exterior of the cylinder,
   and cutter means carried by the piston for severing the cylinder and guiding into the piston material severed from the cylinder.

5. The dispensing container structure of claim 4 wherein the cap portion includes a rim portion enclosing the adjacent portion of the cylinder.

References Cited

UNITED STATES PATENTS

| 1,285,186 | 11/1918 | Horwitz | 222—390 X |
| 3,059,820 | 10/1962 | Gabler | 222—390 X |
| 1,610,484 | 12/1926 | Boggero et al. | 222—80 |
| 1,762,943 | 6/1930 | Zauder | 222—80 |
| 2,634,024 | 4/1953 | Hosmer | 222—80 |
| 3,104,031 | 9/1963 | Wagner | 222—80 |

ROBERT B. REEVES, *Primary Examiner.*

FREDERICK R. HANDREN, *Assistant Examiner.*

U.S. Cl. X.R.

222—390